(12) United States Patent
Miller et al.

(10) Patent No.: US 11,034,064 B2
(45) Date of Patent: Jun. 15, 2021

(54) OVERLAPPING CAUL PLATES AND METHOD FOR COMPOSITE MANUFACTURING

(71) Applicant: The Boeing Company, Chicago, IL (US)

(72) Inventors: Eileen E. Miller, Summerville, SC (US); Daniel Johnson, Charleston, SC (US)

(73) Assignee: The Boeing Company, Chicago, IL (US)

( * ) Notice: Subject to any disclaimer, the term of this patent is extended or adjusted under 35 U.S.C. 154(b) by 266 days.

(21) Appl. No.: 16/116,016

(22) Filed: Aug. 29, 2018

(65) Prior Publication Data
US 2020/0070436 A1     Mar. 5, 2020

(51) Int. Cl.
| | |
|---|---|
| *B29C 43/36* | (2006.01) |
| *B29C 70/34* | (2006.01) |
| *B64C 1/00* | (2006.01) |
| *B29C 70/44* | (2006.01) |
| *B29C 70/54* | (2006.01) |
| *B29C 33/00* | (2006.01) |
| *B29C 65/48* | (2006.01) |
| *B29L 31/30* | (2006.01) |
| *B29C 33/30* | (2006.01) |
| *B29C 43/12* | (2006.01) |

(52) U.S. Cl.
CPC ........ *B29C 43/3642* (2013.01); *B29C 33/005* (2013.01); *B29C 70/342* (2013.01); *B29C 70/446* (2013.01); *B29C 70/54* (2013.01); *B29C 33/305* (2013.01); *B29C 43/12* (2013.01); *B29C 65/48* (2013.01); *B29C 70/44* (2013.01); *B29C 70/541* (2013.01); *B29C 70/543* (2013.01); *B29C 2043/3655* (2013.01); *B29L 2031/3076* (2013.01); *B29L 2031/3082* (2013.01); *B64C 2001/0072* (2013.01)

(58) Field of Classification Search
CPC . B29C 43/3642; B29C 33/005; B29C 70/342; B29C 70/446; B29C 70/54; B29C 70/543; B29C 33/305; B29C 2043/3655; B29C 43/12; B29C 70/541; B29C 70/44; B29C 65/48; B29L 2031/3082
See application file for complete search history.

(56) References Cited

U.S. PATENT DOCUMENTS

| | | | | |
|---|---|---|---|---|
| 5,242,523 A | * | 9/1993 | Willden | B29D 99/0014 156/285 |
| 5,354,195 A | * | 10/1994 | Dublinski | B29C 33/38 425/504 |
| 6,197,146 B1 | * | 3/2001 | Sucic | B29C 43/184 156/245 |
| 8,911,585 B2 | * | 12/2014 | Barlag | B29C 70/443 156/285 |
| 9,039,858 B2 | * | 5/2015 | Dull | B29C 66/532 156/249 |
| 9,522,512 B2 | * | 12/2016 | Georgeson | B29C 66/72321 |

(Continued)

*Primary Examiner* — Benjamin A Schiffman
(74) *Attorney, Agent, or Firm* — Yee & Associates, P.C.

(57) ABSTRACT

A caul plate assembly for applying compaction pressure to a composite structure includes caul plates arranged side-by-side on the surface of the composite structure. The caul plates include overlapping edges of compliant material which form a continuous face applying even pressure and shear across gaps between the caul plates.

34 Claims, 14 Drawing Sheets

(56) References Cited

U.S. PATENT DOCUMENTS

| | | | | |
|---|---|---|---|---|
| 9,751,290 B2* | 9/2017 | Lonsdorfer | ............ | B29C 31/085 |
| 2014/0008015 A1* | 1/2014 | Barlag | ............... | B29D 99/0017 |
| | | | | 156/285 |
| 2014/0356057 A1* | 12/2014 | Griess | ................... | B29C 66/344 |
| | | | | 403/291 |
| 2020/0070436 A1* | 3/2020 | Miller | ................... | B29C 70/446 |

* cited by examiner

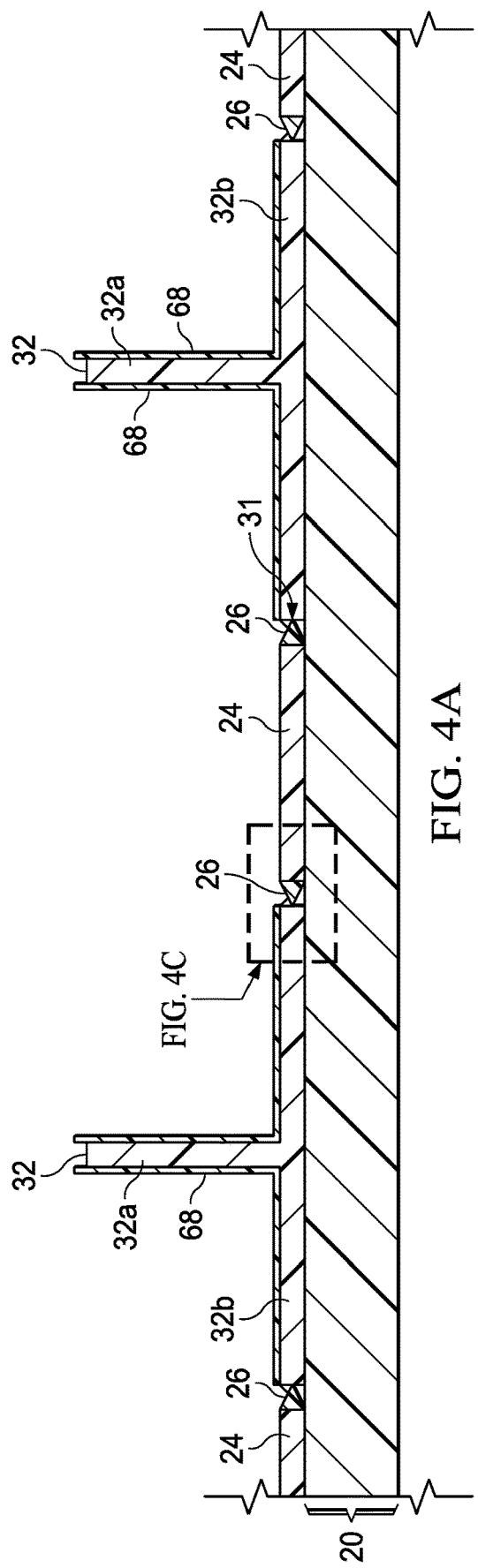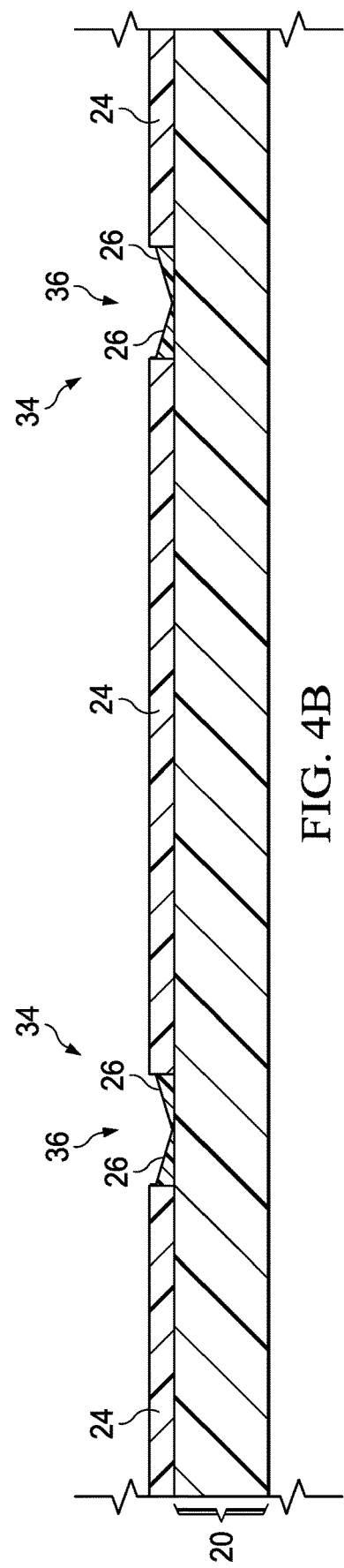

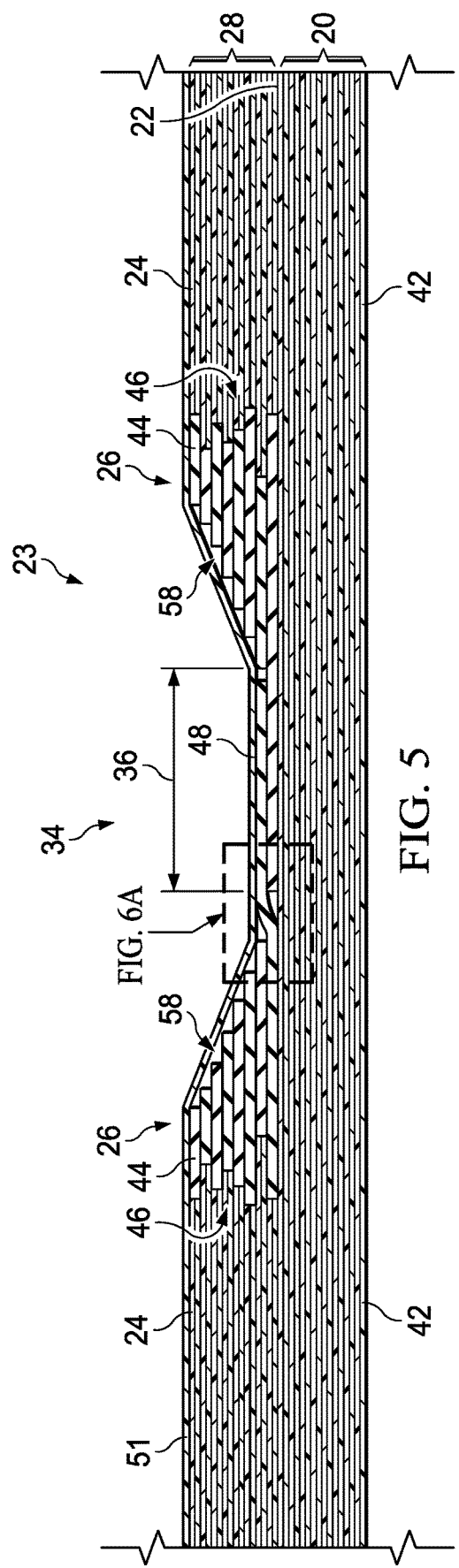

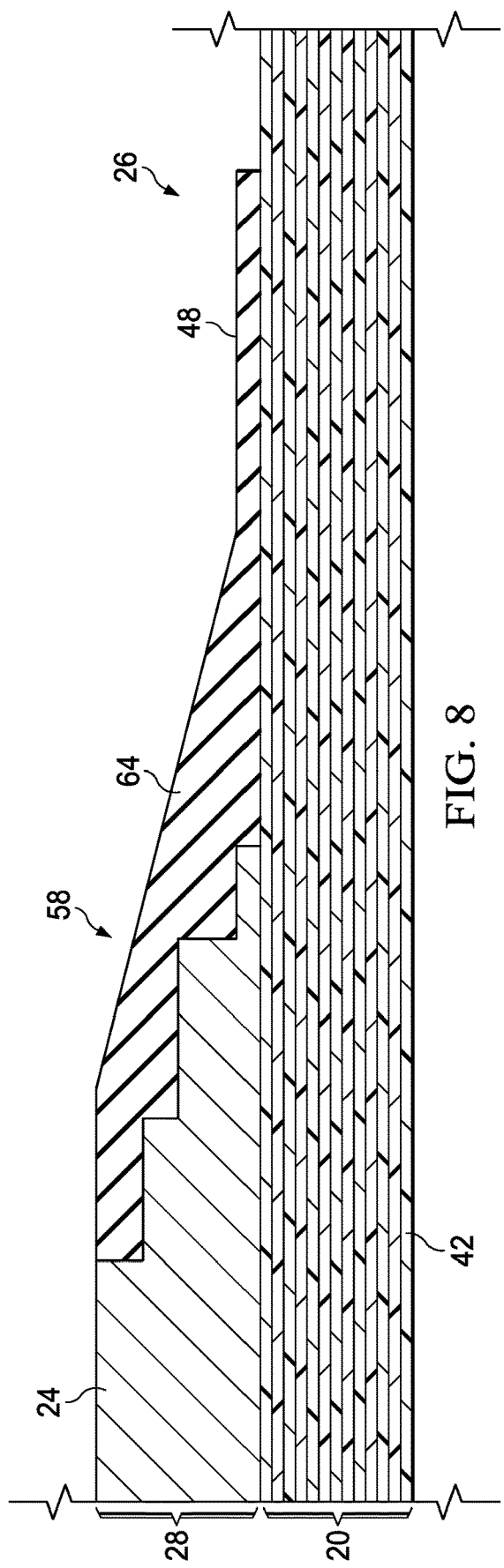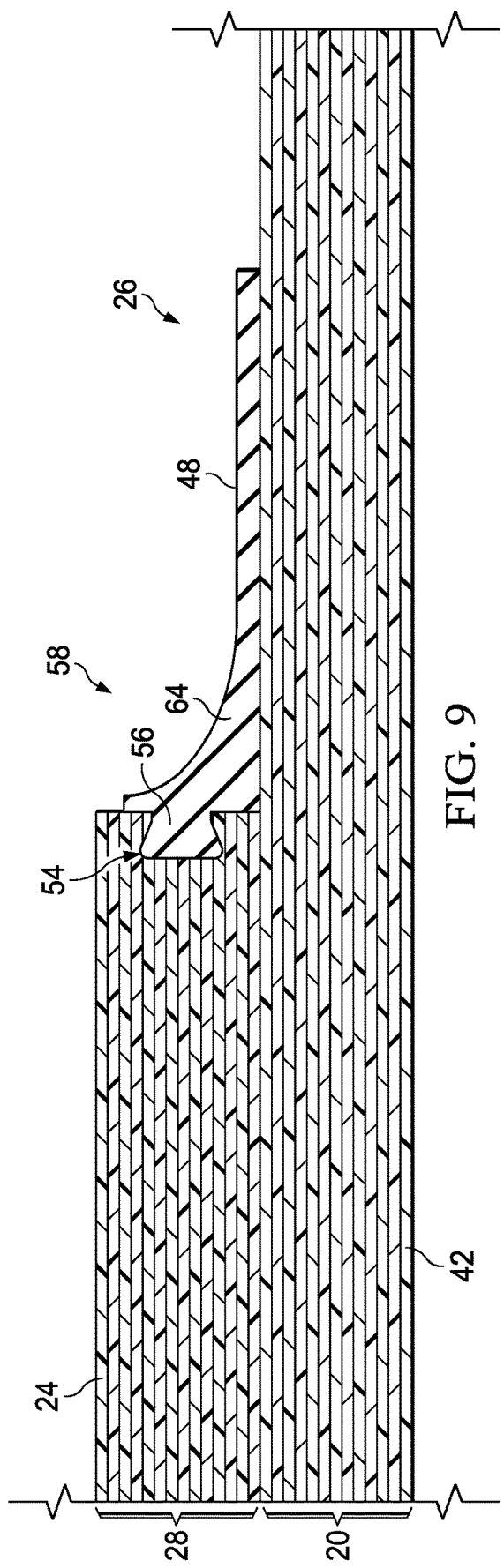

OVERLAPPING CAUL PLATES AND METHOD FOR COMPOSITE MANUFACTURING

BACKGROUND INFORMATION

1. Field

The present disclosure generally relates to caul plates used to compact composite structures, and deals more particularly with overlapping caul plates that cover gaps between them.

2. Background

During the manufacture of some composite structures, caul plates may be placed on the outer surface of the structure during compaction and/or curing to ensure even compaction pressure is applied and/or to create a smooth surface finish. Larger composite structures, such as an aircraft fuselage may require the use of multiple caul plates which are placed next each other. A gap may be left between adjacent caul plates in order to accommodate movement of the caul plates during heating processes. The presence of these gaps may result in uneven distribution of compaction pressure, variations in applied shear, low pressure zones and/or resin pooling.

The phenomena described above may result in surface inconsistencies such as visible lines, seams, porosities, wrinkling or waviness, to name only a few. The surfaces may be sanded in order to reduce or eliminate these inconsistencies, however sanding adds to labor costs and may not achieve an acceptable surface finish. The gaps may be filled by placing precured composite strips beneath the caul plates, but this approach to the problem may not entirely eliminate resin pooling and wrinkling caused by uneven distribution of pressure and shear forces, while also increasing weight and recurring fabrication costs.

SUMMARY

The disclosure relates in general to caul plates used to compact composite structures, and more specifically to overlapping caul plate assemblies that avoid open gaps between the caul plates.

According to one aspect, a caul plate assembly is provided for applying a compaction pressure to a composite structure. The caul plate assembly comprises at least one pair of caul plates arranged side-by-side and configured to be placed on a surface of the composite structure. The caul plates include overlapping compliant edges configured to be exposed to the compaction pressure.

According to another aspect, a caul plate is provided for applying a compaction pressure to a surface of a composite structure. The caul plate includes a caul plate body and a compliant edge. The compliant edge 26 is located along at least one side of the caul plate body. The compliant edge includes an outer margin that is flexible and deformable in response to the application of the compaction pressure.

According to another aspect, a method is provided of compacting a composite structure. The method includes placing at least two caul plates on the surface of the composite structure next to each other and arranged to form a gap therebetween. The method also includes arranging the compliant edges of the caul plates in overlapping relationship to each other, spanning the gap. Further, the method includes applying a compaction pressure to the caul plates, including compressing the compliant edges against each other and against a surface of the composite structure such that the compliant edges form a continuous face that remains in constant contact with the surface of the composite structure across the gap.

According to still further aspect, a method is provided of making a caul plate for compacting a composite structure. The method includes making a caul plate body, and attaching a compliant edge on the caul plate body.

According to another aspect, a method is provided of processing a composite preform. The method comprises placing at least two caul plates against the composite preform with a gap between the caul plates. The method also includes bridging the gap between the caul plates with overlapping compliant edges of the caul plates. The method further includes processing the composite preform, and slipping the compliant edges of the composite preform relative to each other as the composite preform is being processed.

One of the advantages of the disclosed caul plate assembly is that caul plates can be placed in overlapping relationship to each other in order to eliminate open gaps between them. Another advantage is that surface inconsistencies caused by caul plate gaps, low pressure zones, variations in applied shear, uneven pressure distribution on the composite structure surface and resin pooling may be reduced or eliminated. Another advantage is that the need for precured strips to cover gaps between the caul plates, and their recurring cost is eliminated. A still further advantage is that surface finishing techniques such as sanding to eliminate surface inconsistencies may be reduced or eliminated, thereby reducing labor costs and increasing productivity.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and advantages thereof, will best be understood by reference to the following detailed description of an illustrative embodiment of the present disclosure when read in conjunction with the accompanying drawings, wherein:

FIG. 4A is an illustration of a sectional view taken along the line 4A-4A in FIG. 4.

FIG. 4B is an illustration of a sectional view taken along the line 4B-4B in FIG. 4.

FIG. 5 is a cross-sectional view of two adjacent caul plates installed on a composite structure, showing overlapping compliant edges of the caul plates, prior to the application of compaction pressure.

FIG. 8 is an illustration of a cross-sectional view of a portion of a caul plate having an alternate form of a compliant edge.

FIG. 9 is an illustration of a cross-sectional view similar to FIG. 8, but having another form of a compliant edge.

DETAILED DESCRIPTION

Figure 1:
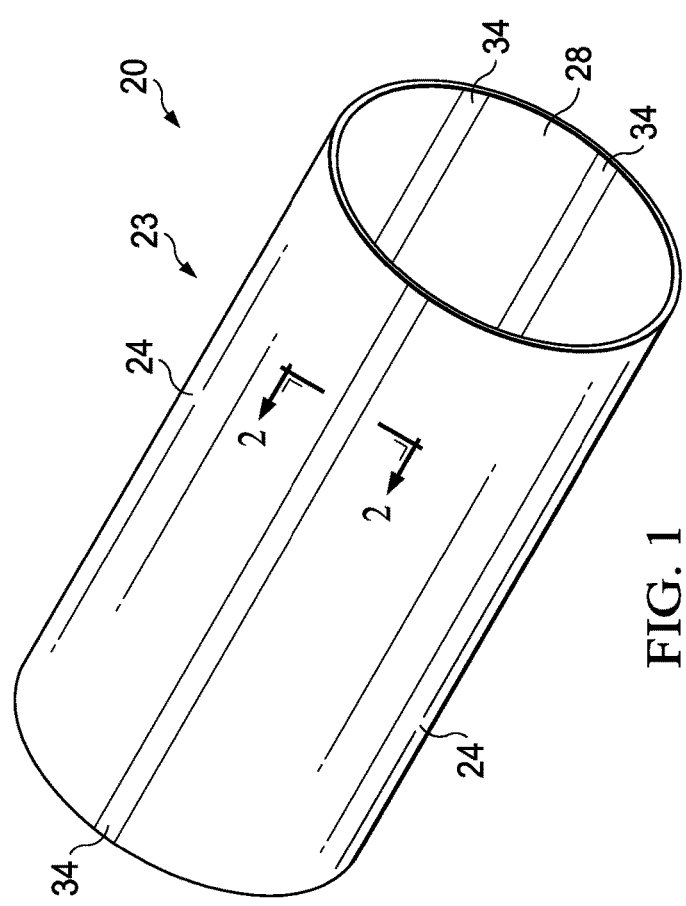
FIG. 1 is an illustration of a perspective view of an aircraft fuselage section having caul plate assemblies installed thereon.
Figure 2:
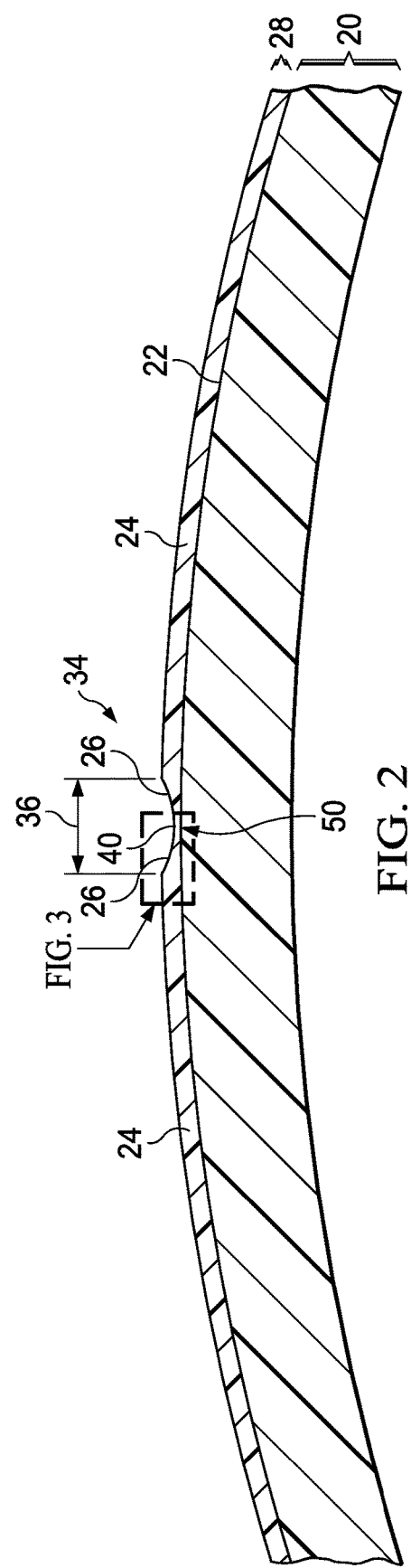
FIG. 2 is an illustration of a sectional view taken along the line 2-2 in FIG. 1.

FIGS. 1 and 2 illustrate a barrel shaped composite structure 20 preform which may be, for example and without limitation, a section of an aircraft fuselage, engine nacelle or some other large cylindrical section. The composite structure 20 may be produced by laying up composite plies (not shown) on a mandrel (not shown) which forms an inner mold line (IML). The outer mold line (OML) of the composite structure 20 is formed by a caul plate assembly 23 comprising a plurality of caul plates 24 having curvatures matching that of the OML. The caul plates 24 are arranged side-by-side on the OML (opposite of the side support on the mandrel), with longitudinally extending gaps between them to allow the caul plates 24 to move relative to each other during thermal processing. For example, when the composite structure 20 preform is subjected to a combination of heat and pressure during curing, the diameter of the composite structure 20 decreases due to the compaction, and the pressure being applied to the caul plates 24 causes them to move toward each other as the structure 20 is being compacted to a smaller diameter. The caul plates 24 may also move toward each other due to thermal expansion.

As shown in FIG. 2, each of the caul plates 24 includes a caul plate body 28 having one or more outer compliant edges 26 formed of a compliant material. As used herein, "compliant" and "compliancy" refer, without limitation, to properties of the compliant edges 26 that allow them to flex, bend, and/or compress in any direction such that they comply and conform to an underlying surface onto which they are compacted. The compliant edges 26 of adjacent ones of the caul plates 24 overlap 40 each other in an overlap zone 36 which extends across the width and along the length of the gap 34 between the spaced apart caul plate bodies 28.

As will be described below in greater detail, when subjected to compaction pressure, the overlapping compliant edges 26 deform in a manner that creates a continuous face 50 overlying the surface 22 of the composite structure 20. The continuous face 50 formed by the overlapping compliant edges on the OML is free of gaps and remains in constant contact with the surface 22 of the composite structure 20 between the gaps 34 throughout processing of the composite structure 20, even though the caul plates 24 may move relative to each other as a result of the processing.

Figure 3:
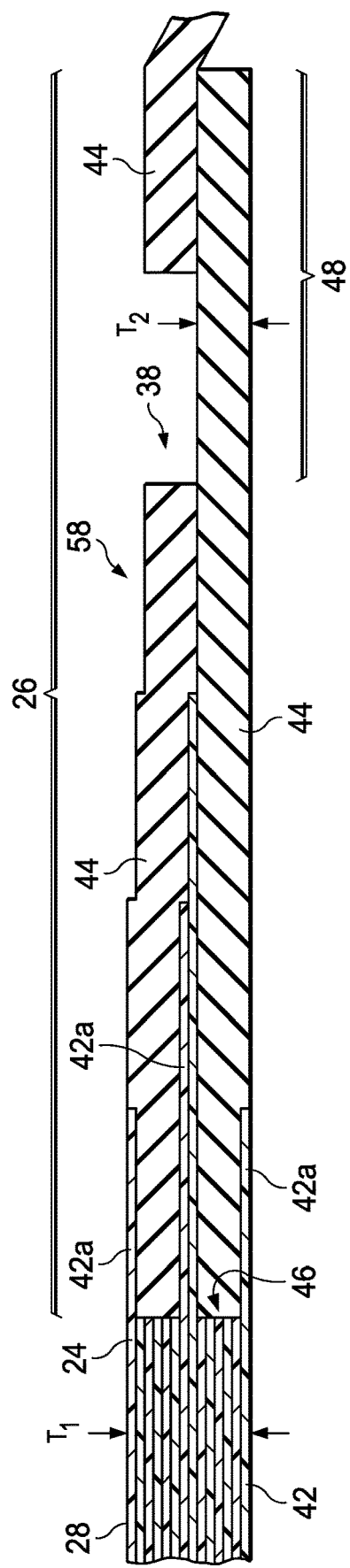
FIG. 3 is an illustration of a view of the area designated as "FIG. 3" in FIG. 2.

Attention is now directed to FIG. 3 which illustrates one form of a compliant edge 26 that is integrated with a caul plate body 28 which can be installed on either the IML or OML of a composite structure 20 preform. In this example, the caul plate body 28 is a composite laminate such as a fiber reinforced thermoplastic or thermoset. However, the caul plate body 28 may comprise a laminate formed of multiple different materials, such as a metal composite having a combination of metal and resin plies. Alternately, as will be discussed below, the caul plate body 28 may be a solid member comprising relatively rigid material such as a high hardness silicone rubber, steel, INVAR® or other alloys. The compliant edge 26 comprises 2 plies of a compliant material that are interleaved 46 with plies 42a of the caul plate body 28. The interleaving of plies of compliant material with those of the caul plate body 28 integrates and thereby mechanically connects the compliant edges 26 with the caul plate body 28. However, other constructions may be used to integrate the compliant edges into the caul plate body 28.

The ply drop-offs 38 of the composite plies 42a and compliant plies 44, although stepped, generally form the overall shape of a taper or bevel 58, with a thickness $T_1$ that decreases to a lesser thickness $T_2$ at the outermost margin 48 of the compliant edge 26. The decreasing thickness from $T_1$ to $T_2$ results in a construction that provides enough material thickness $T_1$ near the caul plate body 28 to effect secure attachment of the compliant edge 26 to the caul plate body 28, while providing a material thickness $T_2$ that is thin enough to render the outer margins with the degree of flexibility required to maintain continuous contact with the surface 22 of the composite structure 20. While only two compliant plies 44 are illustrated in the example shown in FIG. 3, more than two compliant plies 44 are possible. In some applications, it may be possible to employ and integrate only a single compliant ply 44 into the composite plies 42 of the caul plate body 28.

As mentioned above, the general shape of a bevel formed by stepping the compliant plies 44 shown in FIG. 3 provides an increased thickness $T_1$ that may be needed to facilitate mechanical connection of the compliant edge 26 with the caul plate body 28, while also providing an outer margin 48 with a reduced thickness $T_2$. The reduced thickness $T_2$ at the outer margin 48 allows the outer margin to deform by flexing and/or compressing, and thereby comply to the surface 22 when the compliant edge 26 is subjected to compaction pressure. In other words, the reduced thickness 12 at the outer margins 48 of the compliant edges 26 renders them more flexible within the overlap zone 36. However, in other embodiments discussed below, the compliant edge 26 may not be beveled or tapered. For example, the compliant edge 26 may be relatively thin and compliant, with a substantially constant thickness along substantially its entire length. Stepping the compliant plies 44 provides a convenient way of forming the overall shape of tapered edge in those applications where the compliant edge 26 is attached to the caul plate body 28 by interleaving the composite plies 42 with the compliant plies 44. However, as will be discussed below, other constructions may be employed to form a tapered edge other than stepping the plies.

The compliant plies 44 may be formed of any of a variety of compliant materials that are suitable for the application and capable of withstanding the elevated temperatures at which the composite structure 20 is processed. In one example, where the composite structure 20 is a fiber reinforced thermoset, the compliant plies 44 may be selected to withstand temperatures at which the composite structure 20 is cured e.g. up to 400° F. In this example, the compliant plies 44 may be formed of an unreinforced, non-silicone rubber, having elongation at break of 400%-550%, a tensile strength of 1300 psi-1900 psi and a hardness of 65-70 Shore A, and a thickness greater than that of the composite plies 42 of which the caul plate body 28 is formed. However, the compliant material may comprise any of a variety of other elastomeric compounds suitable for the particular application. A composite structure 20 comprising synthetic resins other than thermosets are possible, including thermoplastics and hybrid material systems including both thermoset and thermoplastics.

FIGS. 4, 4A, 4B and 4C illustrate another example of a caul plate assembly 23 in which caul plates 24 having overlapping compliant edges 26 are installed on the IML of a substantially flat composite aircraft skin 30 stiffened with blade stringers 32. In these views, compaction pressure causing the compliant edges 26 to deform has not yet been applied. Also, an overlying vacuum bag assembly and OML tooling such as a mandrel are not shown for simplicity of illustration. Each of the blade stringers 32 includes a blade 32a joined to flanges 32b which are bonded or co-cured to the underlying skin 30. In this application, the composite aircraft skin 30 may comprise a bulkhead or a vertical fuselage skin, wherein the outside 27 of the bulkhead or skin is OML (outer mold line) tooled, while the inside 29 is IML (inner mold line) tooled using the caul plate assembly 23.

Figure 4:
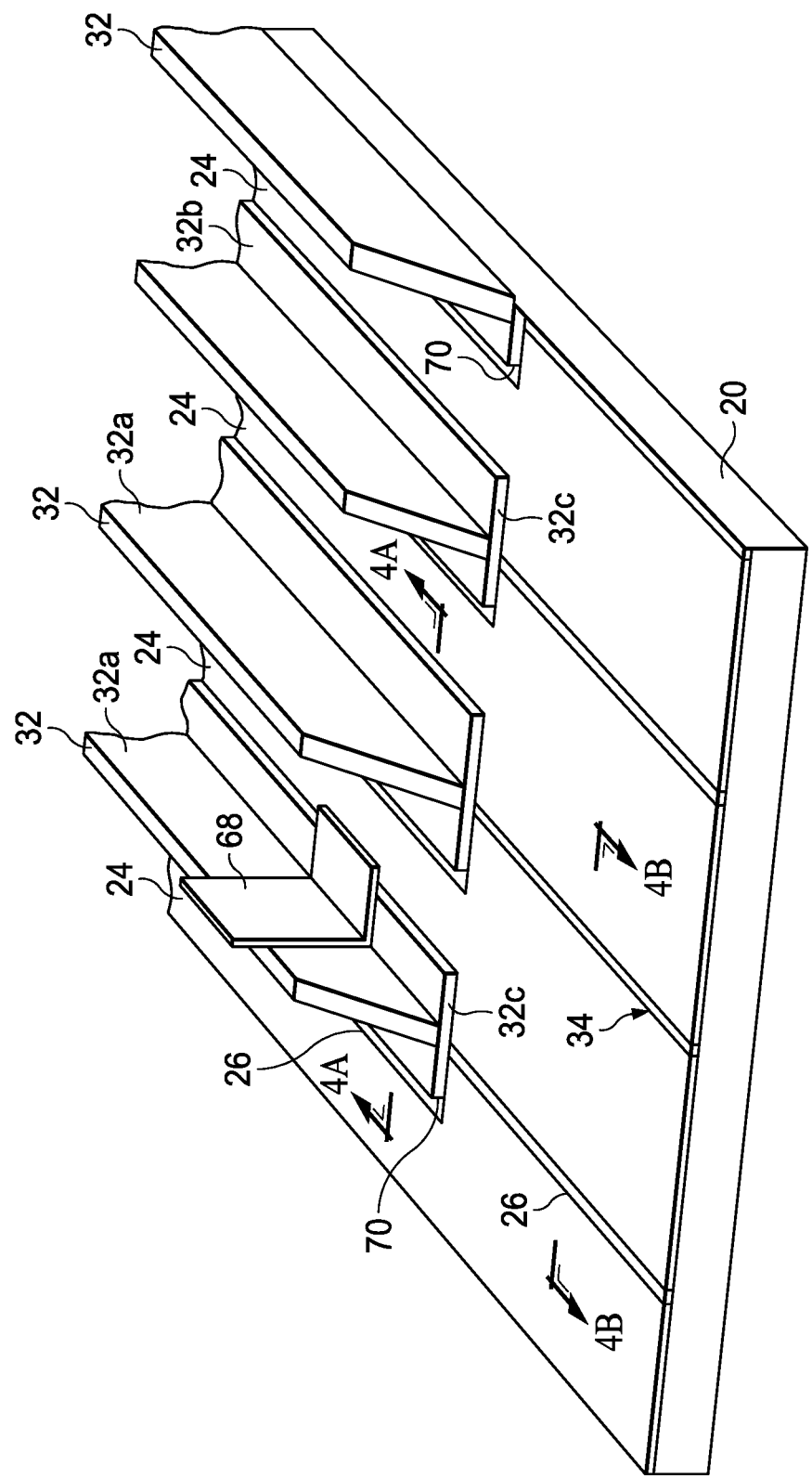
FIG. 4 is an illustration of a fragmentary, perspective view of a section of a composite structure provided with blade type stiffeners, on which caul plate assemblies have been installed, only a portion of a blade stringer caul plate being shown for clarity.
Figure 4C:
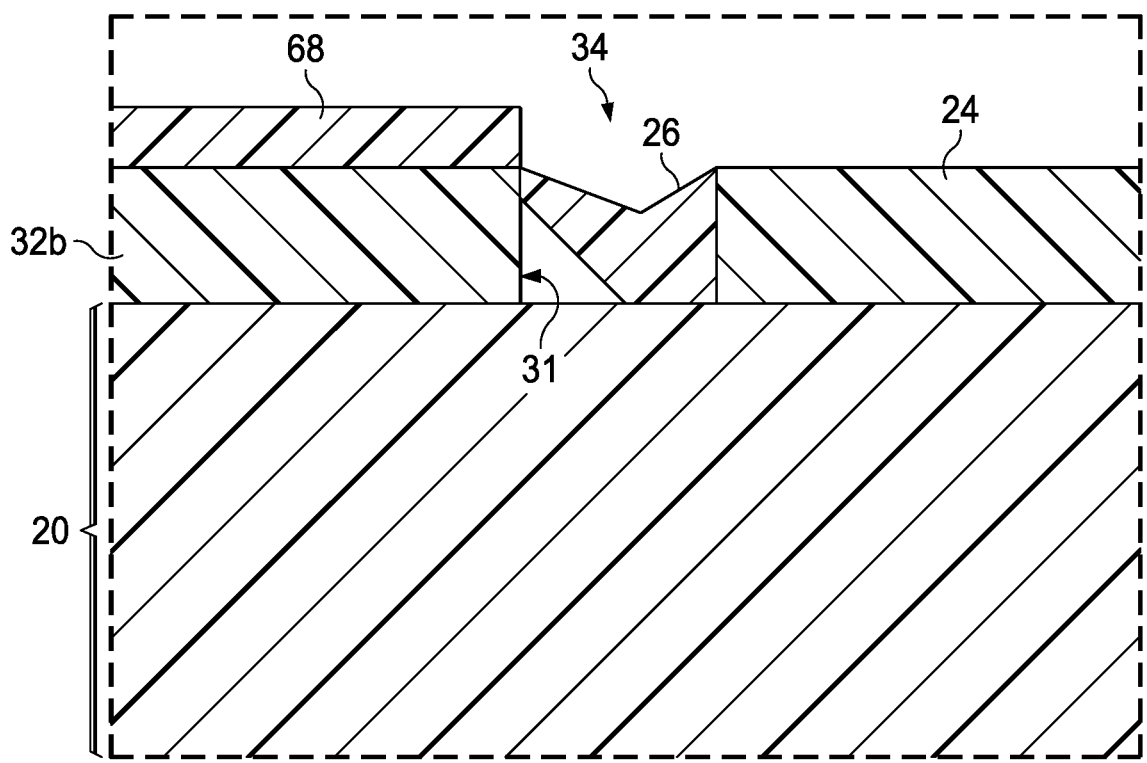
FIG. 4C is an illustration of the area designated as "FIG. 4C" in FIG. 4A. A

As best seen in FIG. 4, the perimeter of the caul plates 24 as well as their compliant edges 26 are shaped to conform to the contour of the stringers 32, and more particularly to the perimeter of the flanges 32b along the lengths of the stringers 32. In the illustrated embodiment, the contours of the caul plates 24 follow those of the blade stringers 32 through a right angle transition at the end of the blade stringers 32. However, other contour transition configurations are possible, providing that the caul plate has a contour shape that is compatible with the shape of the stringer 32. A gap 34 is present between adjacent ones of the caul plates 24 as well as between the caul plates 24 and the sides 32c of the flanges 32b. As shown in FIGS. 4A, 4B and 4C, the compliant edges span the gaps 34 between the caul plates 24 and the sides 32C of the flanges 32b. In those areas where the caul plates 24 are adjacent to each other (see FIG. 4B) the compliant edges 26 overlie each other in an overlap zone 36 spanning the gap 34, similar to the embodiments discussed previously. In those areas where the caul plates 24 extend along the flanges 32b of the blade stringers 32, the compliant edges 26 of the caul plates 24 cover of the gap 34 between the caul plates 24 and the blade stringers 32. In some cases, as shown in FIG. 4C, the compliant edges fill the gap 34 and may contact the sides 31 of the flanges 32b of the blade stringers 32.

Prior to consolidation processing, L-shaped cauls (see FIG. 4A) may be placed on the blade stringers 32 in order to help maintain the shape of the blades 32a and the flanges 32b during consolidation and/or curing, as well as assist in consolidating the stringers 32. Only a portion of one of the L-shaped cauls 68 is shown in FIG. 4 for clarity. The compliant edges 26 shown in FIGS. 4 and 4A-4C may comprise a construction similar to that shown in FIG. 3 or the alternate constructions discussed below. Although a blade type stringer 32 is shown in FIGS. 4, 4A-4C, it is to be understood that that the caul plates 24 with compliant edges 26 may be employed to compact any of a wide variety of other stringer types and shapes as well as other forms of stiffeners.

It should be noted here that in the examples shown in FIGS. 2 and 3, the caul plates 24 are arranged side-by-side, with compliant edges 26 located on opposite sides of each caul plate 24. However, other arrangements are possible. For example, a caul plate assembly 23 may comprise any number of caul plates 24 configured in an array, arranged both side-by-side and end-to-end, where each caul plate 24 has compliant edges 26 on all sides. Moreover, caul plates 24 having compliant edges 26 may be produced in irregular shapes, for example, with curvatures in multiple planes.

Figure 6A:
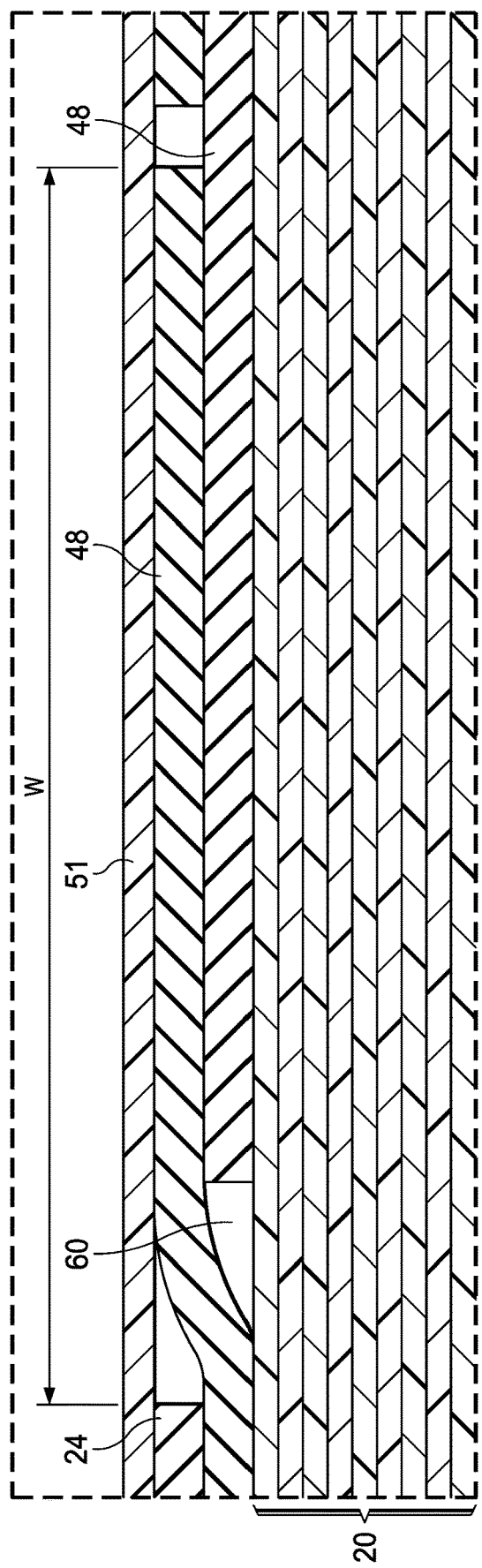
FIG. 6A is an illustration of the area designated as "FIG. 6A" in FIG. 5.

Attention is now directed to FIGS. 5 and 6A, which illustrate in further detail, the overlapping compliant edges 26 of two adjacent caul plates 24 installed on the surface 22 of a composite structure 20, covered by a vacuum bag 51. In this example, each of the compliant edges is formed by compliant plies 44 that are interleaved with composite plies 42 forming the caul plate bodies 28. The outer ends of the compliant plies 44 are stepped or staggered to form the bevel 58. However, as will be discussed below, in some examples, the provision of a bevel 58 may not be required. The lowermost compliant plies 44 of the two adjacent caul plates 24 overlap each other within an overlap zone 36. Sizing of the complaint edges 26 will depend on the application, however generally, the width W (see FIG. 6A) of the outer margins 48 should be sufficient to maintain an overlap of the outer margins 48 throughout movement of the caul plates 24 relative to each other. The distance between the caul plate bodies 28, and the width of the gap 34 will depend on the application, but should be sufficient to allow the caul plate bodies 28 to move relative to each other without interference. The overlap of the compliant edges 26 provides tolerance allows the starting distance between the caul plate bodies 28 to vary. This overlap also allows the compliant plies 44 to slip relative to each other and thereby remain flat, in contact with the surface 22 throughout the gap 34 as the caul plates 24 move relative to each other.

Figure 6B:
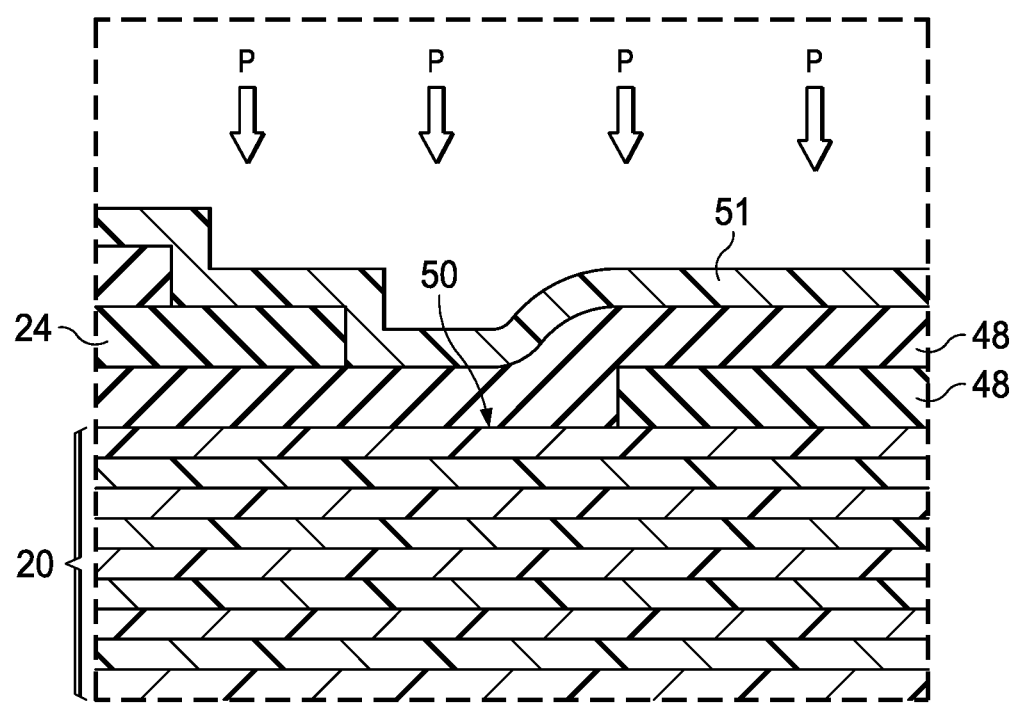
FIG. 6B is an illustration similar to FIG. 6A but showing the deformation of the compliant edges after compaction pressure has been applied.

Referring particularly to FIG. 6A, in some applications, depending on the compliancy of the compliant edges 26, a small gap 60 may be present between the lowermost overlapping compliant edges 26 at the outer margins 48, prior to the application of compaction pressure. The gap 60 is the result of overlapping the two sheets of material which form the compliant edges 26. Upon the application of compaction pressure P (FIG. 7) however, during autoclave and/or vacuum bag processing, the applied pressure P forces the caul plates 24 against the surface 22 of the composite structure 20. The pressure P is also applied to the compliant plies 44 through the evacuated vacuum bag 51, causing them to deform and fill the gap 60, as shown in FIG. 6B, by flexing and/or or compressing. The deformation of the compliant plies 44 which causes them to fill any gaps 60 that may exist, results in the formation of the continuous face 50 that complies to the surface 22 of the composite structure 20 throughout the entire width and length of the gap 34 between the caul plate bodies 28. The continuous face 50 remains in constant contact with the surface 22 throughout processing of the composite structure, resulting in even pressure being applied to the surface 22 across the entire gap 34.

The constant, gap-free contact by the continuous face 50 with the surface 22 of the composite structure 20 prevents resin pooling and provides for constant shear force being applied to the surface 22 across the gap 34. Additionally, the use of a bevel 58 transitioning to a relatively thin outer margin 48 that overlies the outer margin 48 of adjacent caul plate 24 allows for manufacturing tolerances while also allowing the caul plates 24 to move relative to each other during processing. As the caul plates 24 move relative to each other due to compaction of the composite structure 20 or other factors, the overlapping outer margins 48 of adjacent compliant edges 26 may be allowed to slip relative to each other as necessary, thereby preventing them from wrinkling and pulling away from the surface 22 of the composite structure 20.

The applied pressure P compresses the compliant edges 26 through the vacuum bag 51, longitudinally and/or through their respective thicknesses, causing them to flex and otherwise deform such that they comply to the surface of the composite structure 20. In any event, the compliancy of the compliant edges 26 under the applied compaction pressure P assures that the continuous face 50 remains in constant contact with the surface 22 throughout the gap 34 as the caul plates 24 move relative to each other. As a result of these features, wrinkling due to caul plate movement and uneven shear is avoided, while other inconsistencies caused by the uneven application of compaction pressure are reduced or eliminated.

Figure 7:
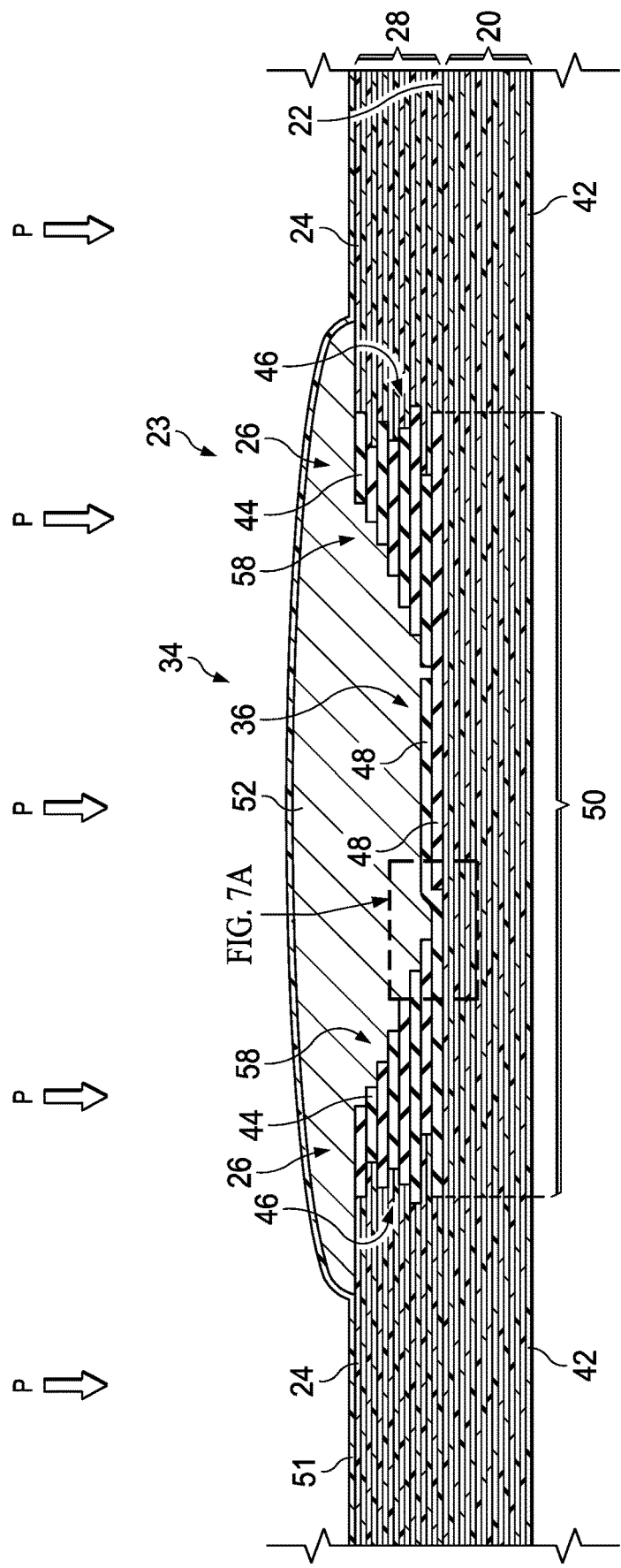
FIG. 7 is an illustration similar to FIG. 5, wherein an optional pressure intensifier has been placed over the caul plates covering the overlapping compliant edges, after compaction pressure has been applied.

Optionally, as shown in FIG. 7, a pressure intensifier 52 may be placed beneath a vacuum bag 51 spanning the overlap zone 36 in order to apply additional pressure in this area and thereby compensate for the absence of rigid caul material across the gap 34. The pressure intensifier 52 may comprise, for example and without limitation, a rubberized, flexible material capable of withstanding cure temperatures without degradation. Upon application of autoclave and/or vacuum bag pressure P, the compliant edges 26 flex and/compress, thereby deforming as necessary to form the continuous face 50. The compression of the compliant edges 26 within the overlap zone 36 may occur longitudinally or through their respective thicknesses. As previously indicated the gap-free, continuous face 50 evenly applies and distributes compaction pressure over the entire surface 22 of the composite structure 20 within the gap 34.

It may be possible to fabricate alternate forms of the compliant edges 26 by employing compliant material other than compliant plies. For example, referring to FIG. 8, a compliant edge 26 in the form of a solid compliant member 64 of unitary construction provided with a bevel 58 may be adhesively bonded to the caul plate 24 in the area of ply drop-offs of the composite plies 42. In this example, the caul plate 24 is a solid structure, rather than a laminate, formed from any material, such as a metal that is suitable for the application. Alternatively however, the solid compliant member 64 could likewise be bonded to a composite laminate caul plate 24. The compliant edge 26 includes an outer margin 48 of reduced thickness that is configured to be overlapped by a similar compliant edge 26 (not shown) on an adjacent caul plate 24.

FIG. 9 illustrates another form of the compliant edge 26 that is mechanically attached to a caul plate body 28. In this example, the compliant edge 26 is a solid compliant member 64 that includes a bevel 58 provided with a key 56 that is received within a way 54 formed in the caul plate body 28. In this example, the caul plate 28 body 28 is a laminate, but in other examples the caul plate body 28 may be solid. The bevel 58 transitions into an outer margin 48 of reduced thickness to provide the compliant edge 26 with the desired compliancy.

Figure 10:
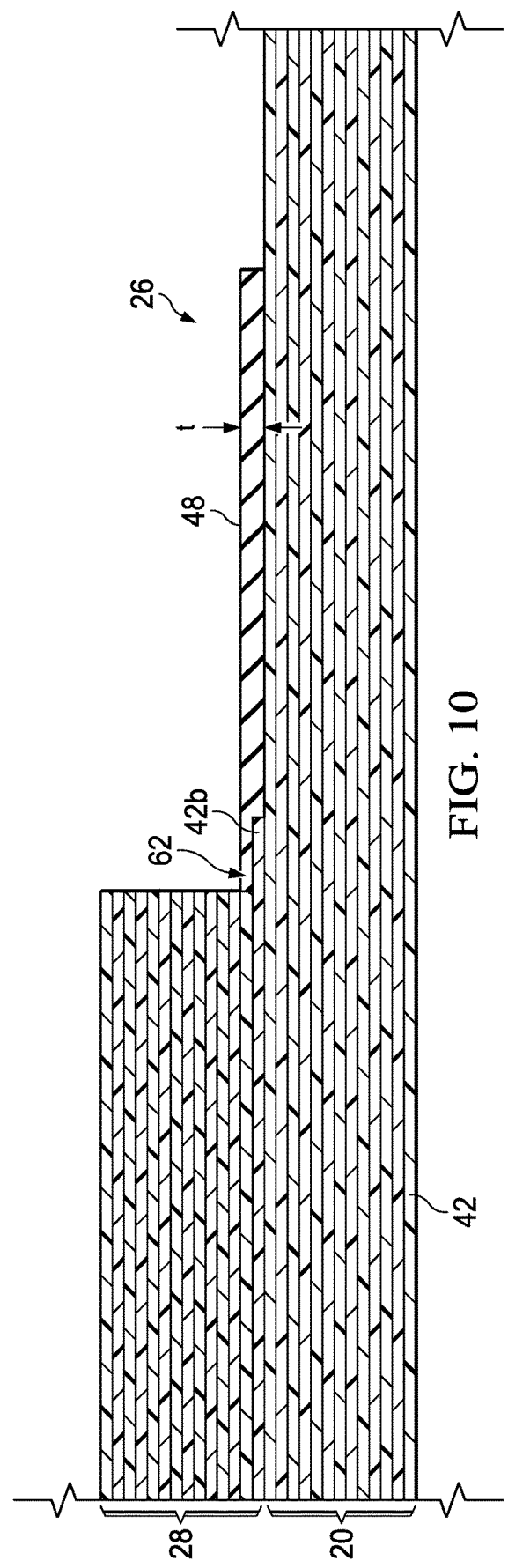
FIG. 10 is an illustration of a cross-sectional view also similar to FIG. 8, but having another form of a compliant edge.

A further form of a compliant edge 26 as shown in FIG. 10. In this example, the compliant edge 26 has a substantially uniform thickness t throughout its length and has an inner end that overlies 62 one or more plies 42b of a caul plate body 28. The compliant edge 26 may be attached to the caul plate body 28 at the overlying area 62 by adhesive bonding. In this example, the caul plate body 28 is a laminate, but in other examples the compliant edge 26 shown in FIG. 10 may be bonded to a solid caul plate body 28. In still other examples, a compliant edge 26 of uniform thickness similar to that shown in FIG. 10 may be attached to the caul plate body 28 using a suitable mechanical connection.

Figure 11:
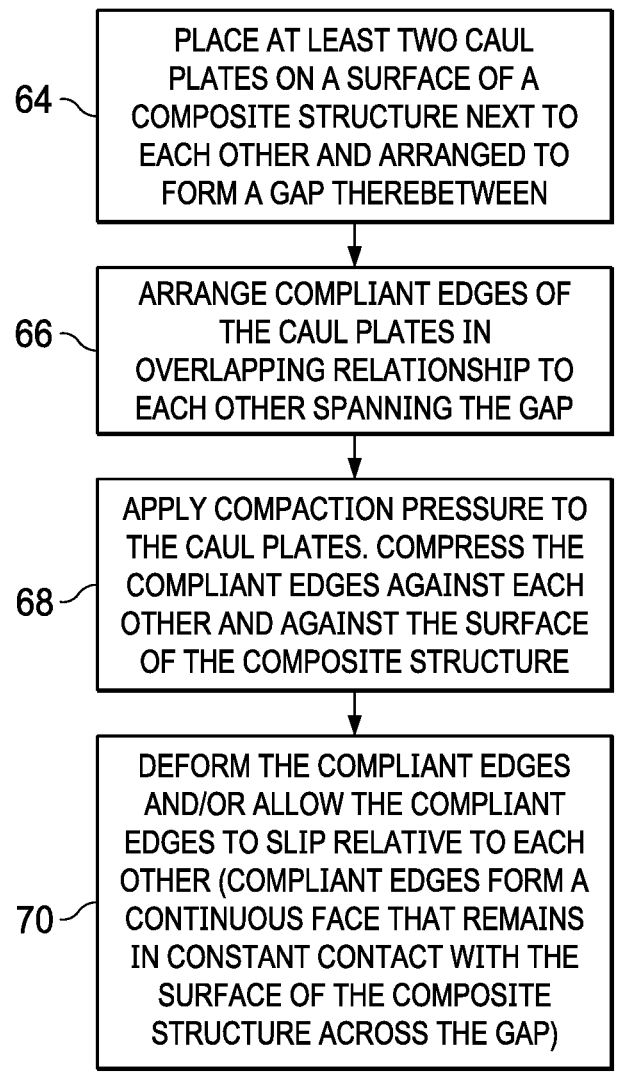
FIG. 11 is an illustration of a flow diagram of a method of manufacturing a composite structure using caul plates having overlapping compliant edges.

Attention is now directed to FIG. 11 which illustrates the overall steps of a method of making a composite structure 20 using caul plate assemblies 23 comprising caul plates 24 having overlapping, compliant edges 26. At 64, at least two of the caul plates 24 are placed on a surface 22 of a composite structure 20 next to each other, and arranged to form a gap 34 therebetween. At 66, the compliant edges 26 of the caul plates 24 are arranged in overlapping 40 relationship to each other spanning the gap 34. At 68, compaction pressure P is applied to the caul plates 24. This compaction pressure compresses the compliant edges 26 against each other and against the surface 22 of the composite structure 20. At 70, the compliant edges 26 are deformed by the applied compaction pressure P, and/or compliant edges 26 are allowed to slip relative to each other as the caul plates move relative to each other. Deformation of the compliant edges 26 causes them to form a continuous face 50 that remains in constant contact with the surface 22 of the composite structure 20 regardless of movement of the caul plates 24 relative to each other during processing.

Figure 12:
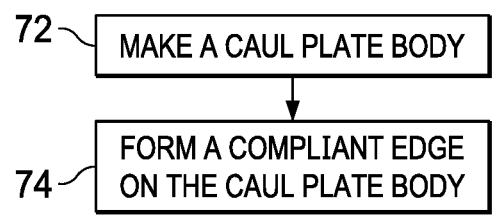
FIG. 12 is an illustration of a flow diagram of a method of manufacturing a caul plate for compacting a composite structure.

FIG. 12 broadly illustrates the steps of a method of making a caul plate 24 for compacting a composite structure 20. At 72, a caul plate body 28 is made. At 74, a compliant edge and 26 is formed on the caul plate body 28.

Figure 13:
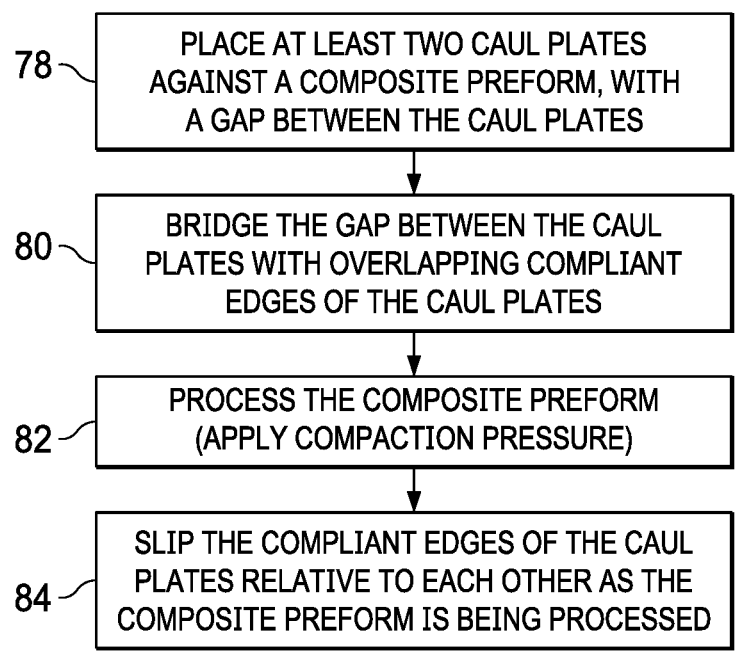
FIG. 13 is an illustration of a flow diagram of a method of processing a composite preform.

Attention is now directed to FIG. 13 which broadly illustrates the steps of a method of processing a composite preform 20. At 78, at least two caul plates 24 are placed against a composite preform 20, with a gap 34 between the two caul plates 24. At 80, the gap 34 between the caul plates 24 is bridged with overlapping compliant edges 26 of the caul plates 24. At 82, the composite preform 20 is processed, as by applying compaction pressure to the composite preform 20. At 84, the compliant edges 26 of the caul plates 24 are allowed to slip relative to each other as the composite preform 20 is being processed.

Figure 14:
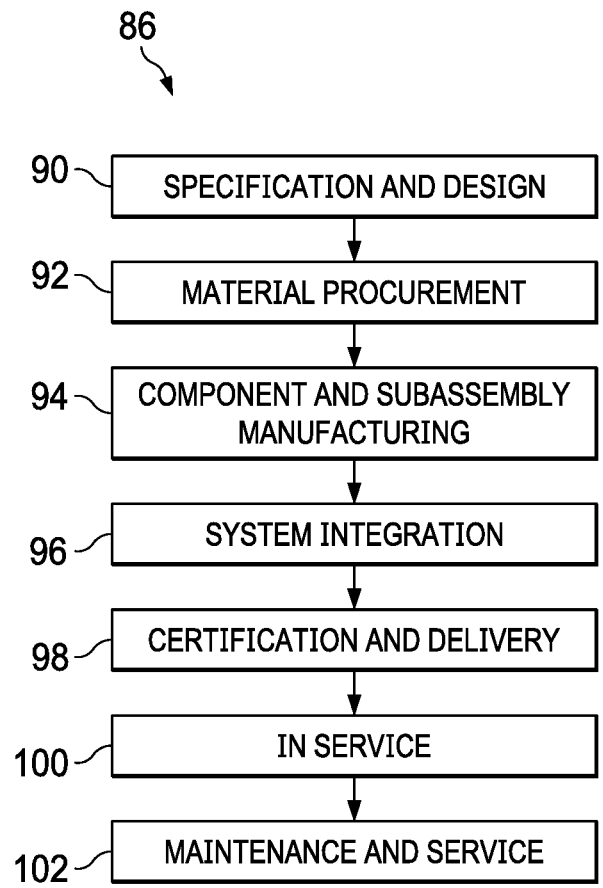
FIG. 14 is an illustration of a flow diagram of aircraft production and service methodology.
Figure 15:
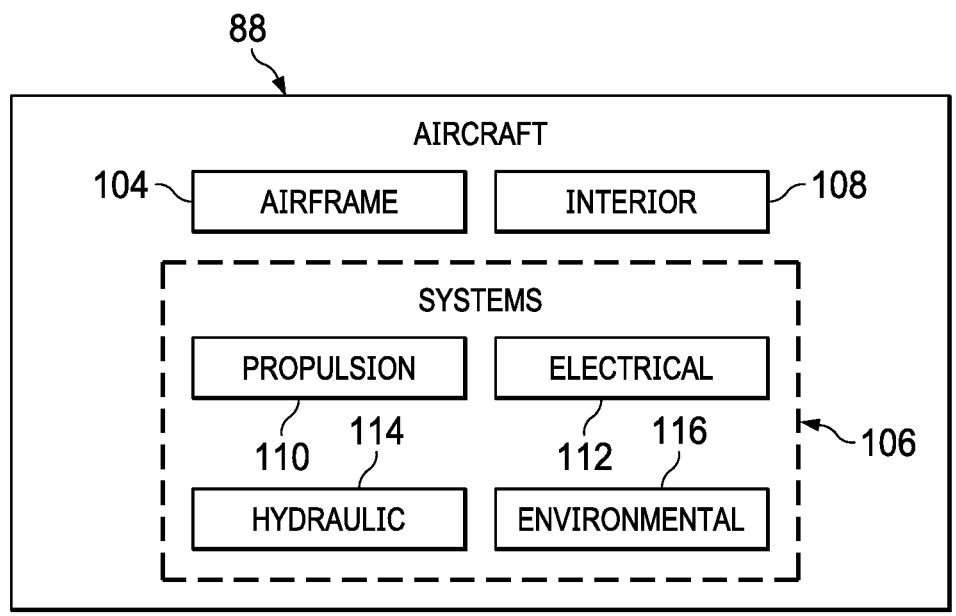
FIG. 15 is an illustration of a block diagram of an aircraft.

Embodiments of the disclosure may find use in a variety of potential applications, particularly in the transportation industry, including for example, aerospace, marine, automotive applications and other application where composite structures may be used. Thus, referring now to FIGS. 14 and 15, embodiments of the disclosure may be used in the context of an aircraft manufacturing and service method 86 as shown in FIG. 14 and an aircraft 88 as shown in FIG. 15. Aircraft applications of the disclosed embodiments may include, for example, without limitation, composite airframe components 104 such as wings, bulkheads and fuselage sections, as well as composite interior components 108. During pre-production, exemplary method 86 may include specification and design 90 of the aircraft 88 and material procurement 92. During production, component and subassembly manufacturing 94 and system integration 96 of the aircraft 88 takes place. Thereafter, the aircraft 88 may go through certification and delivery 98 in order to be placed in service 100. While in service by a customer, the aircraft 88 is scheduled for routine maintenance and service 102, which may also include modification, reconfiguration, refurbishment, and so on. Portions of the aircraft 88 may be assembled as part of one or more of component and subsystem manufacturing 94, system integration 96, as well as in the production of the airframe 104 and the interior 108 of the aircraft 88.

Each of the processes of method 86 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 15, the aircraft 88 produced by exemplary method 86 may include an airframe 104 with a plurality of systems 106 and an interior 108. Examples of high-level systems 106 include one or more of a propulsion system 110, an electrical system 112, a hydraulic system 114 and an environmental system 116. Any number of other systems may be included. Although an aerospace example is shown, the principles of the disclosure may be applied to other industries, such as the marine and automotive industries.

Systems and methods embodied herein may be employed during any one or more of the stages of the production and service method 86. For example, components or subassemblies corresponding to production process 94 may be fabricated or manufactured in a manner similar to components or subassemblies produced while the aircraft 88 is in service. Also, one or more apparatus embodiments, method embodiments, or a combination thereof may be utilized during the production stages 94 and 96, for example, by substantially expediting assembly of or reducing the cost of an aircraft 88. Similarly, one or more of apparatus embodiments, method embodiments, or a combination thereof may be utilized while the aircraft 88 is in service, for example and without limitation, to maintenance and service 102.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different advantages as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A caul plate assembly for applying a compaction pressure to a composite structure, comprising:
   at least one pair of caul plates arranged side-by-side and configured to be placed on a surface of the composite structure, the caul plates including overlapping compliant edges configured to be exposed to the compaction pressure, wherein the caul plates include spaced apart caul plate bodies forming a gap therebetween; and
   a pressure intensifier installed over the overlapping compliant edges spanning the gap between the caul plate bodies, the pressure intensifier being configured to intensify the compaction pressure applied to the overlapping compliant edges and compensate for an absence of rigid caul material over the gap.

2. The caul plate assembly of claim 1 wherein the overlapping compliant edges fully cover and contact the surface of the composite structure between the caul plates upon application of the compaction pressure.

3. The caul plate assembly of claim 1, wherein each of the overlapping compliant edges is a laminate.

4. The caul plate assembly of claim 1 wherein each of the overlapping compliant edges includes bevel.

5. The caul plate assembly of claim 4, wherein:
   the overlapping compliant edges respectively include outer margins that are deformable in response to the compaction pressure, and
   the outer margins overlap each other and are configured to form a continuous face that maintains constant contact with the surface of the composite structure upon application of the compaction pressure.

6. The caul plate assembly of claim 1, wherein each of the overlapping compliant edges is integrated into one of the caul plates.

7. The caul plate assembly of claim 6, wherein:
   each of the caul plates includes a caul plate body including composite plies,
   each of the overlapping compliant edges includes compliant plies, and
   the composite plies and the compliant plies of at least one caul plate are interleaved to form a mechanical connection between the caul plate body and the compliant edge.

8. The caul plate assembly of claim 7, wherein at least one compliant edge has a thickness less than a thickness of at least one caul plate body.

9. The caul plate assembly of claim 7, wherein at least one ply of the compliant plies of at least one caul plate is an elastomer.

10. The caul plate assembly of claim 1 wherein the caul plates move relative to each other when the compaction pressure is applied, and wherein the compliant edges are configured to slip relative to each other.

11. The caul plate assembly of claim 1 wherein the composite structure is a composite preform.

12. Fabricating a portion of an aircraft using the caul plate assembly of claim 1.

13. A caul plate for applying a compaction pressure to a surface of a composite structure, comprising:
   a caul plate body, wherein the caul plate body includes a plurality of composite plies; and
   a compliant edge located along at least one side of the caul plate body, the compliant edge including an outer margin, the outer margin being flexible and deformable in response to application of the compaction pressure, wherein the compliant edge includes a plurality of compliant plies,
   wherein the plurality of composite plies and the compliant plies are interleaved, and
   wherein the compliant edge is configured to overlap a compliant edge of an adjacent caul plate and configured to be exposed to the compaction pressure.

14. The caul plate of claim 13, wherein the compliant edge includes is mechanically connected to the caul plate body.

15. The caul plate of claim 13, wherein:
   the compliant edge is bonded to the caul plate body.

16. The caul plate of claim 13, wherein at least one ply of the compliant plies of the caul plate is an elastomer.

17. The caul plate of claim 13, wherein the compliant edge has a thickness less than a thickness of the caul plate body.

18. The caul plate of claim 13, wherein the compliant edge is a laminate.

19. The caul plate of claim 13 wherein the compliant edge includes a bevel.

20. The caul plate of claim 13 wherein the plurality of compliant plies of the compliant edge are staggered to form a bevel.

21. The caul plate of claim 13 wherein the caul plates are configured to move relative to the adjacent caul plate when the compaction pressure is applied, and wherein the compliant edge is configured to slip relative to the compliant edge of the adjacent caul plate.

22. The caul plate of claim 13 wherein the composite structure is a composite preform.

23. Fabricating a portion of an aircraft using the caul plate of claim 13.

24. A method of compacting a composite structure, comprising:
    placing at least two caul plates on a surface of the composite structure next to each other and arranged to form a gap therebetween;
    arranging compliant edges of the caul plates in overlapping relationship to each other spanning the gap;
    applying a compaction pressure to the caul plates; and
    applying pressure to a pressure intensifier installed over the compliant edges spanning the gap between the caul plates, the pressure intensifier being configured to intensify the compaction pressure applied to the compliant edges spanning the gap and to compensate for an absence of rigid caul material over the gap, wherein compressing the compliant edges against each other and against the surface of the composite structure such that the compliant edges form a continuous face that remains in constant contact with the surface of the composite structure across the gap.

25. The method of claim 24, wherein compressing the compliant edges includes deforming the compliant edges to fill a gap between the compliant edges at the surface of the composite structure.

26. The method of claim 24 wherein the caul plates move relative to each other when the compaction pressure is applied, and the method further includes:
    allowing the compliant edges to slip relative to each other.

27. The method of claim 24, wherein placing the at least two caul plates includes placing the caul plates on a side of the composite structure opposite a side of the surface supported on a mandrel.

28. The method of claim 24, wherein the compliant edge is a laminate.

29. The method of claim 24 wherein the compliant edge includes bevel.

30. The method of claim 24 wherein at least one compliant edge comprises a plurality of compliant plies staggered to form a bevel.

31. The method of claim 30, wherein at least one compliant ply of the plurality of compliant plies is an elastomer.

32. The method of claim 24, wherein the compliant edge has a thickness less than a thickness of a caul plate body of at least one caul plate.

33. The method of claim 24 wherein the composite structure is a composite preform.

34. A portion of an aircraft assembled according to the method of claim 24.

\* \* \* \* \*